Patented Mar. 30, 1926.

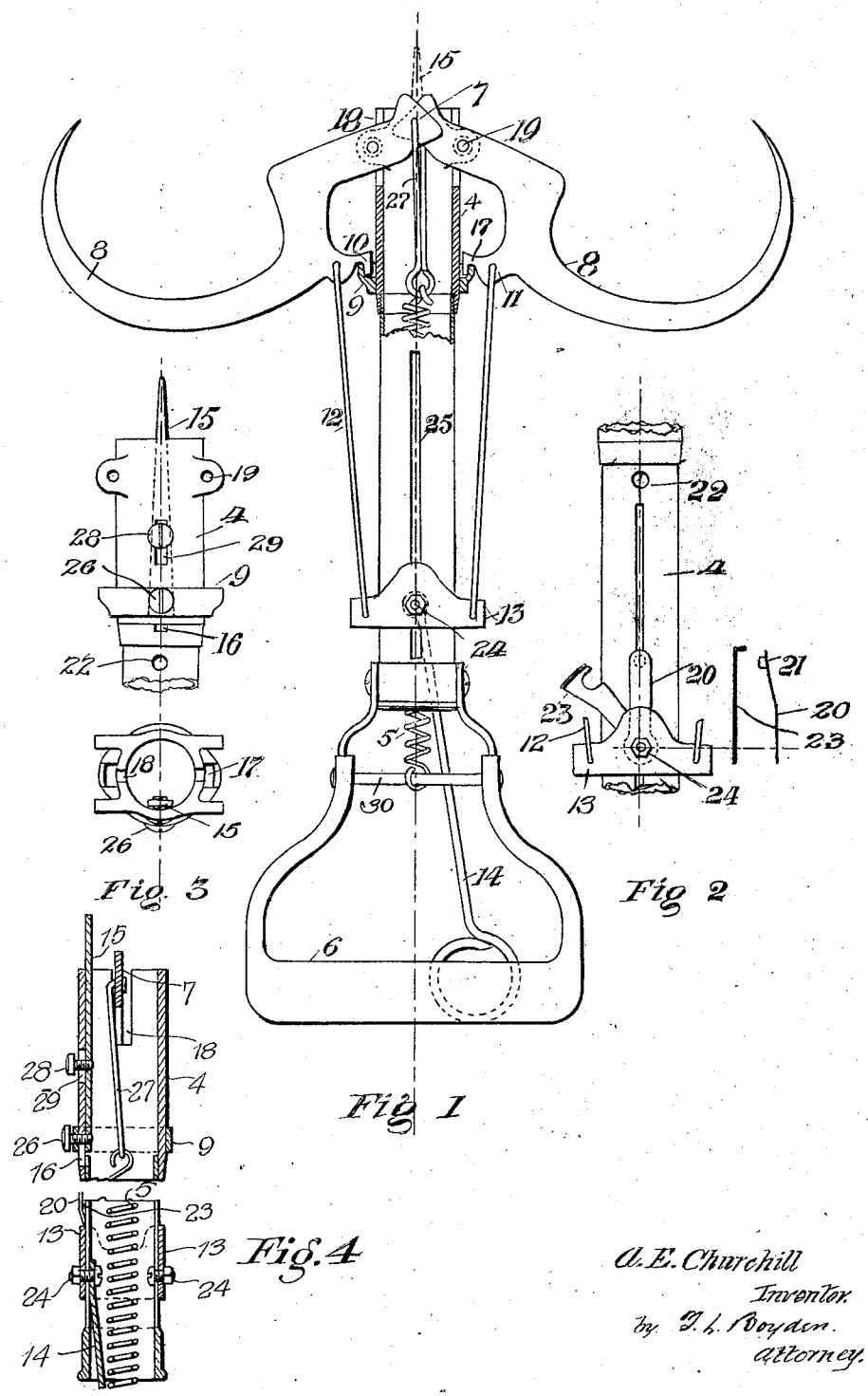

1,578,711

UNITED STATES PATENT OFFICE.

ADELBERT E. CHURCHILL, OF VICTORIA, BRITISH COLUMBIA, CANADA.

COMBINATION FISHING GAFF.

Application filed March 11, 1922. Serial No. 543,031.

*To all whom it may concern:*

Be it known that I, ADELBERT EVELIN CHURCHILL, a citizen of the Dominion of Canada, subject of King George the Fifth of Great Britain, and a resident of the city of Victoria, in the Province of British Columbia, Canada, have invented new and useful Improvements in Combination Fishing Gaffs, of which the following is a specification.

This invention relates to fishing gaffs which operate semi-automatically by the release of a spring under tension.

The object of the invention being to provide a gaff for commercial fishing which is suitable for use under a variety of conditions with a maximum of handiness, reliability and speed.

In the drawings forming part of this application Fig. 1 is a general side elevation, Fig. 2 is a view from the opposite side showing the locking device, Fig. 3 gives an external end view of the tube giving details of the trip ring, and has the corresponding outside elevation above it showing the release pin and its connections, Fig. 4 is a longitudinal section through the centre line of Fig. 1 showing the upper and lower ends of the tube with the details in connection: 4 is a metal tube preferably brass or bronze re-inforced at each end for strengthening purposes. This tube surrounds the helical extension spring 5, the latter being at one end secured to the cross pin 30 in the extension to the handle 6. The other end of the spring 5 is attached to two wire links 27 which connect with the heels 7 of the gaff hooks 8. A trip ring 9 encircles the tube 4 along which it slides sufficiently to release the detents 10. The trip ring 9 is notched or recessed at 17 to receive the projections 10 which form a detent on the back of each of the gaff hooks 8.

The projections on the back of the gaff hooks 8 which terminate in the detent 10 also provide at 11 centres for the attachment of the wire connectors 12 which connect to the exterior guide 13. The guide 13 is in connection with the finger grip 14 which is secured to the screw pin 24. The releasing pin 15 is in connection with the trip ring 9 by means of the screw 26 passing through the slot 16; thus when the pin strikes a fish the screw traverses the slot 16 taking with it the trip ring 9 and thereby releasing the detents 10.

The metal tube 4 is slotted at 18 to receive the heels of the hooks 8 which are pivoted at the fulcrum 19. The adjusting screw 28 engages the releasing pin 15 through the slot 29 along which the screw slides and so provides a modicum of friction. The locking device shown in Fig. 2 consists of a flat spring clip 20 having a projection 21 which engages the hole 22 when the slide 13 is pulled along the tube 4 by the spring 5 when the hooks 8 close. When the locking device is not required the intercepting piece 23 which is centered at 24 is turned into position below the catch 20. In order to facilitate the manipulation of the handle the latter is not rigidly secured to the tube 4, the screw holes in the tube are slotted so as to permit a slight turning movement between the handle and the tube.

There are two ways of operating my device, first by setting the hooks 8 wide open under the tension of the spring 5 secured by the trip ring device 9 and 10. This is done by drawing back the finger grip 14 at the handle 6 until the hooks 8 are fully extended and the heel tips 10 forming the detent fall into the notches 17 in the trip ring 9. Under this condition the tension spring 5 is at its maximum length and tension, the finger grip 14 which is attached to the cross pin 24 of the slide 13 has drawn the latter along the tube 4 along which it is controlled by the guide slots 25, and with it the tension wires 12, these latter being attached to the back of the hooks near the projection 10. This action pulls open the hooks 8 at the same time raising the opposite ends of the hooks 8 at 7, thereby extending the spring 5. The device is now set for action which is obtained by striking the fish with the projecting release pin 15, this pin being in rigid contact with the trip ring 9 by the screw 26 so that as the pin 15 is depressed the detents 10 are thereby released and the spring 5 is able to exert its full tension to close the hooks 8, the slide 13 travelling along the tube 4 as the spring 5 contracts. The hook end of the spring 5 is attached to the heels of the hooks by the wire links 27.

The second method of operation is to use the finger tension grip 14 without making use of the ring trip 9 and the detent 10. This is done by drawing the grip 14 and the slide 13 which extends the spring 5 and so exerts a closing force on the two hooks 8, the grip and hooks being released by the fingers as and when desired.

There is a provision for modifying the striking force required for the release pin 15, by adjusting the screw 28 which enters the release pin 15 through the slot 29 in the tube 4; by tightening the screw a slight frictional resistance is set up between the tube and the pin.

I claim:

1. In a fishing device of the type described, the combination of a metal sleeve enclosing a helical spring attached to the heels of two hooks which are each pivoted to the said tube, a tripping ring exterior to and sliding along said tube with recesses engaging projections on the outside of said hooks, and means for releasing the said tripping ring from said hook projections.

2. In a fishing device of the type described, the combination of a metal sleeve enclosing a helical spring, the said spring being attached to the heels of two hooks which are each pivoted to the said tube, a tripping ring exterior to and sliding along said tube and having recesses engaging projections on the outside of the said hooks, said ring being connected through a slot in said tube to a pin sliding within said tube and projecting beyond it.

3. In a fishing device of the type described, the combination of a metal tube enclosing a helical spring, a handle attached to the end of said tube, two hooks of approximately semi-circular form each separately pivoted near opposite sides and near the other end of said tube, an extension on each of said hooks beyond said pivots, said extensions being secured to the helical spring within said tube, two projections on the outer edge of said hooks, said projections to engage in recesses in an exterior sliding ring on said tube, and means for releasing said ring from said hook projections.

4. In a fishing device of the type described, the combination of a metal tube enclosing a helical spring, a handle attached to the end of said tube, two hooks of approximately semi-circular form each separately pivoted near opposite sides and near the other end of said tube; extensions on said hooks beyond said pivots, said extensions being secured to the helical spring within said tube, two projections on the outer edge of said hooks, said projections to engage in recesses in an exterior sliding ring on said tube; said ring being connected through a slot in said tube to a pin sliding within said tube and projecting beyond it, a wire connection on each side of said tube connected at one end to the projections on the outer edges of said hooks, and at the other end to an exterior slide working along a slot guide in said tube, a wire connection inside said tube terminating in a finger grip near the said handle and secured to said slide.

5. In a fishing device of the type described, the combination of a metal tube enclosing a helical spring, a handle attached to end of said tube, two hooks of approximately semi-circular form each separately pivoted near opposite sides and near the other end of said tube; extensions on said hooks beyond said pivots, said extensions being secured to the helical spring within said tube, two projections on the outer edges of said hooks, said projections to engage in recesses in an exterior sliding ring on said tube; said ring being connected through a slot in said tube to a pin sliding within said tube and projecting beyond it, a wire connection on each side of said tube connected at one end to the projections on the outer edges of said hooks and at the other end to an exterior slide working along a slot guide in said tube, a wire connection inside said tube terminating in a finger grip near the said handle and secured to said slide; a locking device to prevent said exterior slide from longitudinal movement and consisting of a spring clip with a projection to engage a hole in said tube, and means to intercept said locking device from operating.

Signed at Victoria, B. C., March 2nd. 1922.

A. E. CHURCHILL.